(12) United States Patent
Arnold et al.

(10) Patent No.: US 7,694,500 B2
(45) Date of Patent: Apr. 13, 2010

(54) DRIVE ASSEMBLY AND DRIVE SYSTEM FOR A COMBINE HEAD

(75) Inventors: Matthew David Arnold, Moline, IL (US); Steven Timothy Rieck, Cambridge, IL (US); Eric Hans Stone, Port Byron, IL (US); Michael Bennet Downey, Hampton, IL (US); Troy Allen Kost, Le Claire, IA (US); Joseph Albert Teijido, East Moline, IL (US)

(73) Assignee: Deere & Company, Moline, IL (US)

( * ) Notice: Subject to any disclaimer, the term of this patent is extended or adjusted under 35 U.S.C. 154(b) by 433 days.

(21) Appl. No.: 11/588,656

(22) Filed: Oct. 26, 2006

(65) Prior Publication Data
US 2007/0197327 A1 Aug. 23, 2007

Related U.S. Application Data

(60) Provisional application No. 60/774,558, filed on Feb. 17, 2006.

(51) Int. Cl.
*A01D 34/00* (2006.01)
(52) U.S. Cl. ...................................... 56/14.4
(58) Field of Classification Search ................. 56/11.2, 56/11.3, 14.3, 14.4; 460/16, 20, 116; 474/94, 474/148, 156, 160, 161; 74/572, 573, 574
See application file for complete search history.

(56) References Cited

U.S. PATENT DOCUMENTS

| 2,823,553 | A | * | 2/1958 | Harrington | 474/91 |
| 3,717,981 | A | | 2/1973 | Van Der Lely | |
| 3,985,038 | A | * | 10/1976 | Fowler | 474/136 |
| 4,048,790 | A | | 9/1977 | Zweegers | |
| 4,216,641 | A | * | 8/1980 | Koch et al. | 56/14.4 |
| 4,631,910 | A | | 12/1986 | Doyen et al. | |
| 4,899,523 | A | | 2/1990 | Frumholtz et al. | |
| 5,133,174 | A | | 7/1992 | Parsons, Jr. | |
| 5,527,218 | A | * | 6/1996 | Van den Bossche et al. | 460/20 |
| 6,073,429 | A | | 6/2000 | Wuebbels et al. | |
| 6,336,882 | B1 | * | 1/2002 | Ullein et al. | 474/161 |
| 6,651,412 | B1 | | 11/2003 | Sierk et al. | |

FOREIGN PATENT DOCUMENTS

EP 0491405 A1 6/1992

OTHER PUBLICATIONS

European Search Report dated Jun. 19, 2007, 4 pages.

* cited by examiner

*Primary Examiner*—Robert E Pezzuto

(57) ABSTRACT

A drive assembly for a combine head includes a hub and a bearing received over a portion of the hub. The bearing defines a rotational axis of the hub. A plane passes radially through the bearing relative to the axis. A sprocket is coupled to the hub and is coaxial with the bearing. The sprocket has a plurality of teeth located around a perimeter of the sprocket, the plurality of teeth being located so that the plane passes radially through the plurality of teeth.

6 Claims, 6 Drawing Sheets

DRIVE ASSEMBLY AND DRIVE SYSTEM FOR A COMBINE HEAD

This is a non-provisional application based upon U.S. provisional patent application Ser. No. 60/774,558, entitled COMBINE ROW UNIT DRIVE SYSTEM, filed Feb. 17, 2006.

FIELD OF THE INVENTION

This invention relates to combine harvesters. More particularly, it relates to combine heads. Even more particularly, it relates to row unit drives for combine heads.

BACKGROUND OF THE INVENTION

In the prior art, as illustrated in FIG. 1, a drive system 10 includes a pair of elongated driveshafts 12, 14 that are arranged to be substantially parallel. Each of driveshafts 12, 14 are rotatably coupled to a frame member 16 via a respective bearing 18, 20. Coupled to the ends of driveshafts 12, 14, is a respective sprocket 22, 24, which are drivably coupled by a chain (not shown) in a manner as is well known in the art. In this prior art arrangement, the teeth of sprockets 22, 24 are cantilevered outward on respective driveshafts 12, 14 with respect to bearings 18, 20. Accordingly, for example, under the high loads that drive the row units of a corn head via sprockets 22, 24, this prior art arrangement results in forces in directions F1 and F2, and in turn results in the flexing of driveshafts 12, 14, as illustrated by curved lines C1 and C2. As a result of the flexing of driveshafts 12, 14, the chains that drive, or are driven by, the driveshafts 12, 14 are bent and wear rapidly.

What is needed, therefore, is an improved combine row unit drive system that is more rigid and reduces wear on the sprockets and chains.

SUMMARY OF THE INVENTION

The invention, in one form thereof, is directed to a drive assembly for a combine head. The drive assembly includes a hub and a bearing received over a portion of the hub. The bearing defines a rotational axis of the hub. A plane passes radially through the bearing relative to the axis. A sprocket is coupled to the hub and is coaxial with the bearing. The sprocket has a plurality of teeth located around a perimeter of the sprocket, the plurality of teeth being located so that the plane passes radially through the plurality of teeth.

The invention, in another form thereof, is directed to a combine head. The combine head includes a frame, and an end wall coupled to the frame. A plurality of row units is coupled to the frame. A driveshaft is drivably coupled to the plurality of row units. A drive system includes a drive assembly. The drive assembly is coupled to the end wall and is coupled to the driveshaft. The drive assembly includes a bearing and a sprocket. The bearing rotatably supports the driveshaft, and defines a rotational axis of the driveshaft. A plane passes radially through the bearing perpendicular to the rotational axis. The sprocket is drivably coupled to the driveshaft. The sprocket has a plurality of teeth located around a perimeter of the sprocket, wherein the plurality of teeth is located so that the plane passes radially through the plurality of teeth.

The invention, in another form thereof, is directed to a method for driving a combine head. The method includes positioning a bearing along a rotational axis; and positioning a sprocket having a plurality of perimetrical teeth relative to the bearing along the rotational axis such that the bearing and the sprocket are coaxial, and such that a plane passes radially through both the bearing and the plurality of teeth of the sprocket relative to the rotational axis.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 2:
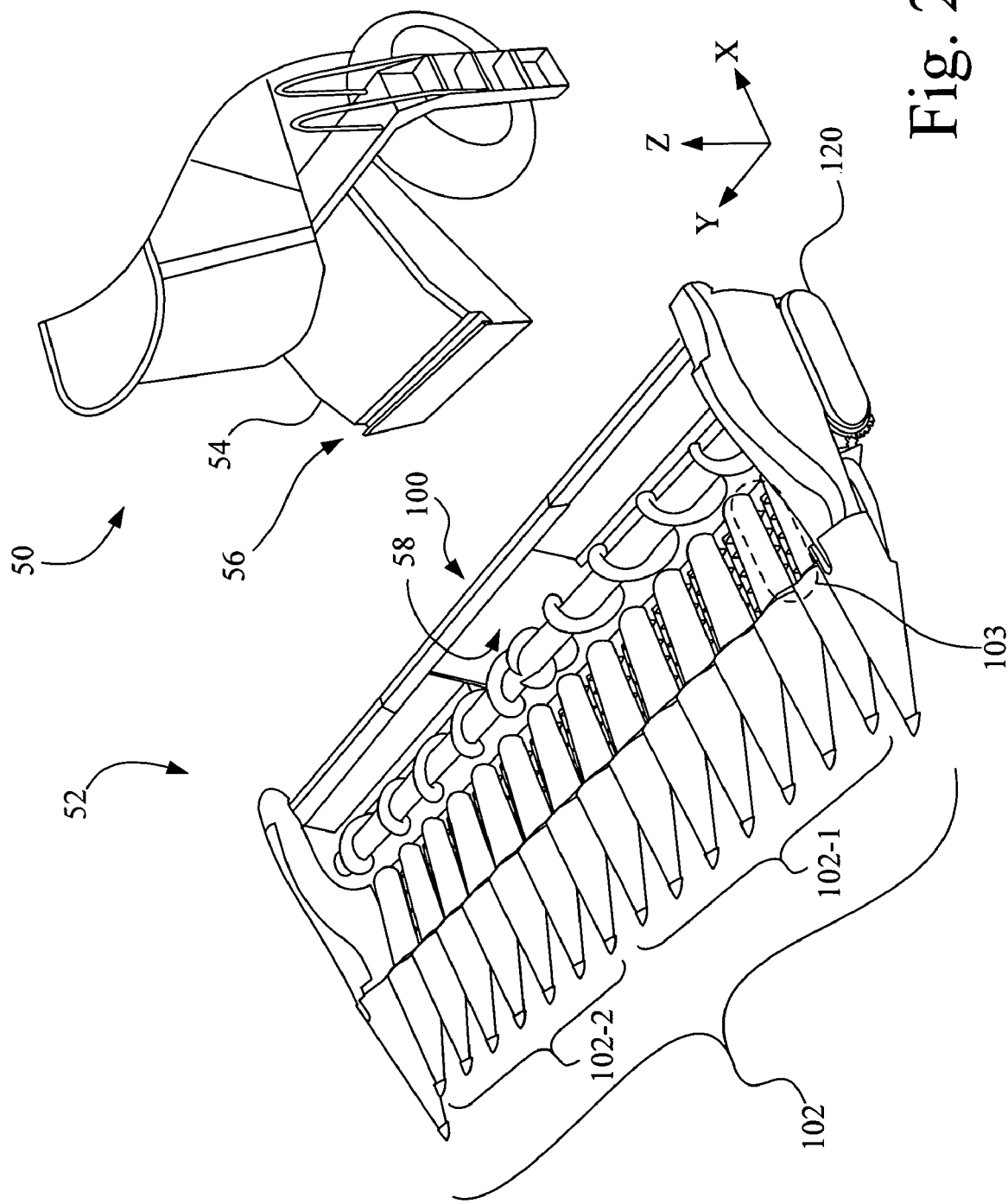
FIG. 2 is a perspective view of a combine and a combine head, with the combine head being configured in accordance with an embodiment of the present invention.

Referring now to the figures, and particularly FIG. 2, there is shown a combine 50 and a combine head 52. FIG. 2 is oriented with respect to a common orthogonal coordinate system in which the X-axis extends from the origin toward the rear of the combine and/or combine head in a longitudinal direction, the Z-axis extends from the origin vertically, and the Y-axis extends from the origin laterally, e.g., rightwardly, or orthogonal to the other two axes, across the combine and/or combine head.

Combine 50 includes a feeder house 54 that extends from the front of combine 50. A front end 56 of feeder house 54 is configured to support combine head 52 in a manner known in the art. Combine head 52 defines a rectangular aperture or opening 58 that receives front end 56 of feeder house 54 as combine head 52 is mounted on combine 50 in a manner known in the art.

Figure 3:
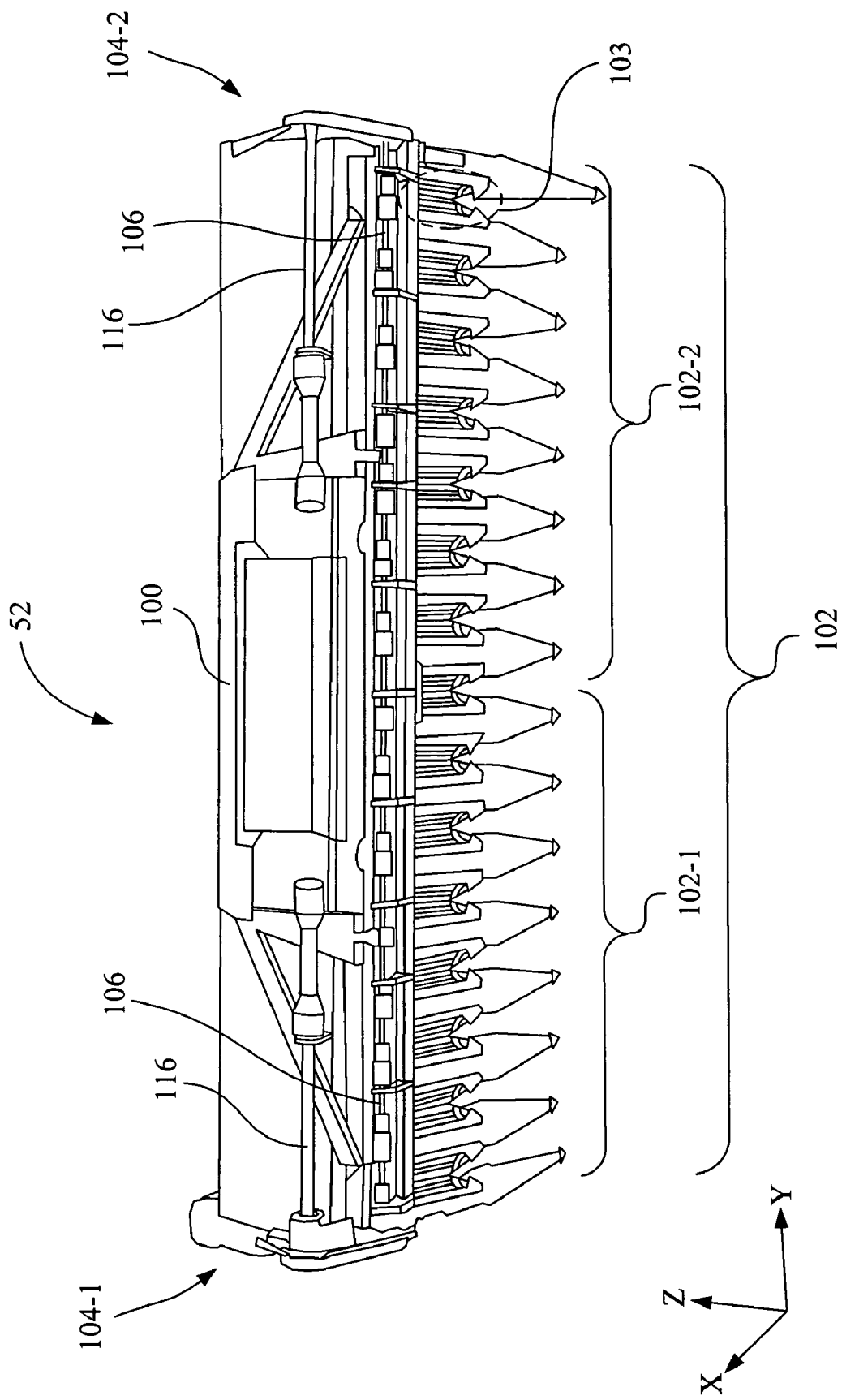
FIG. 3 is a bottom perspective view of the combine head of FIG. 2.
Figure 4:
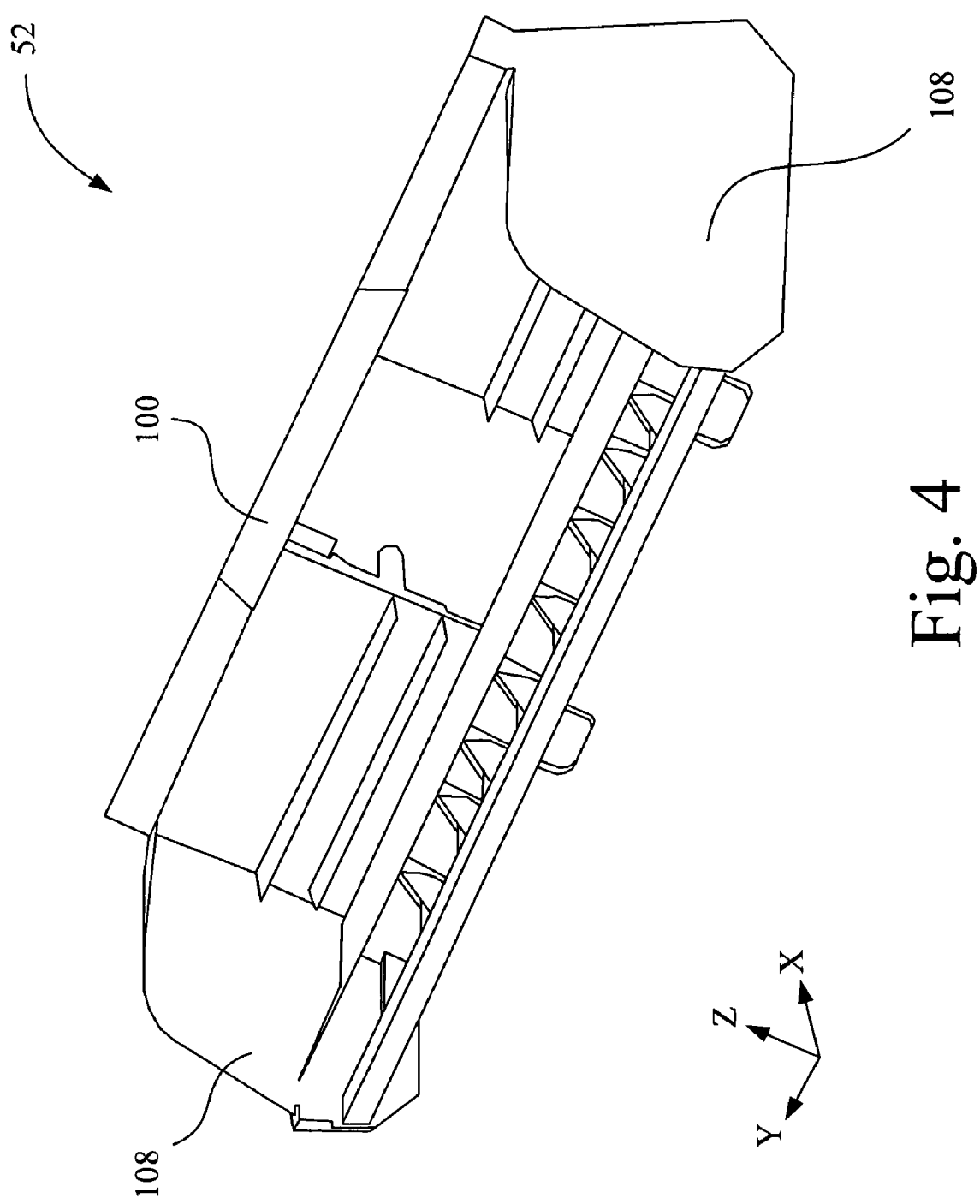
FIG. 4 is a perspective view of the frame and end walls of the combine head of FIG. 3.

Referring also to FIGS. 3 and 4, combine head 52, such as a corn head in the embodiment shown, includes a combine head frame 100 to which a plurality of row units 102, e.g., corn head units, is coupled, e.g., by bolts and brackets. Each row unit of the plurality of row units 102 includes harvesting components 103, such as for example a pair of stalk rolls, gathering chains, etc., associated with each individual row unit for gathering crops.

Combine head 52 also includes two row unit drive systems, a drive system 104-1 and a drive system 104-2, which may be substantially identical in configuration. Drive system 104-1 is configured to drive row units 102-1 of the plurality of row units 102 generally on the left side of combine head 52 and the other drive system 104-2 is configured to drive row units 102-2 of the plurality of row units 102 generally on the right side of combine head 52.

Figure 5:
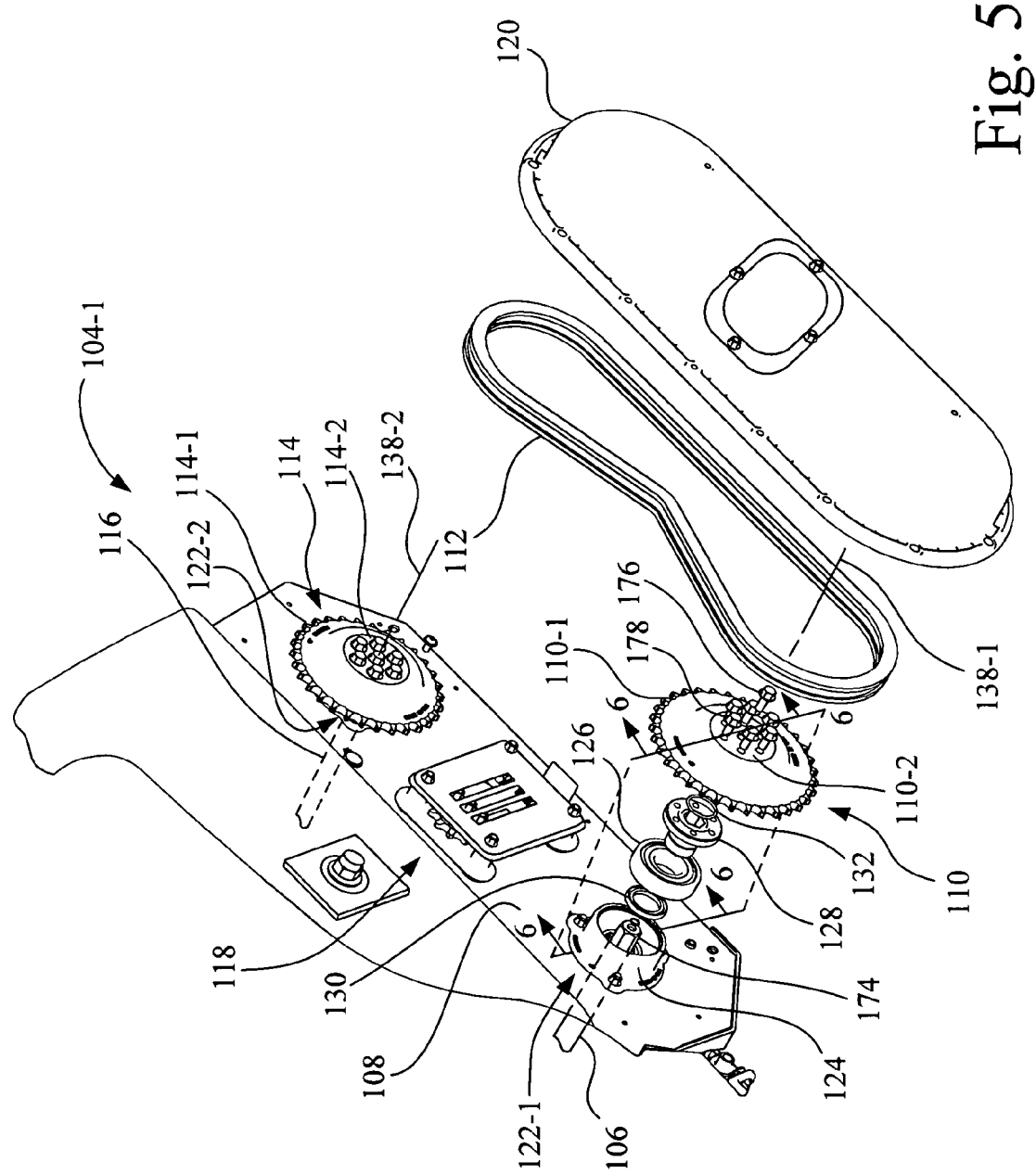
FIG. 5 is an exploded view of a drive assembly of the combine head of FIG. 2.

As illustrated in FIGS. 3-5, each drive system 104-1, 104-2 includes a row unit driveshaft 106 that extends through and is supported by the end sheet, or end wall, 108 of combine head 52. Row unit driveshaft 106 is drivably coupled to the plurality of row units 102, and more particularly, to the harvesting components 103 of the plurality of row units 102. With respect to each drive system 104-1, 104-2, a sprocket 110 is fixed to the end of each driveshaft 106. A plurality of teeth 110-1 is located around a perimeter of sprocket 110. A second sprocket 114 is supported on a second driveshaft 116 that extends through end wall 108 of combine head 52. A plurality of teeth 114-1 is located around a perimeter of sprocket 114. The outer perimeter of sprockets 110, 114 may be, but need not be, the same. For example, the number of the plurality of perimetrical teeth 110-1 may be, but need not be, the same as the number of the plurality of perimetrical teeth 114-1.

A chain 112 engages the teeth 110-1 of sprocket 110 and the teeth 114-1 of sprocket 114, and extends from sprocket 110 backward to sprocket 114, to drivably couple sprocket 110 to sprocket 114. An idler sprocket assembly 118 is attached to end wall 108, and provides adjustable tensioning of chain 112. A cover/chain guard 120 is provided to cover chain 112 and sprockets 110, 114, and is attached to end wall 108.

In an alternative arrangement, these drive system components may be configured to drive all of the plurality of row units 102 using only one of the drive systems 104-1, 104-2. In this arrangement, a single drive system (e.g., either the left side drive system 104-1 or the mirror image right side drive system 104-2) is provided to drive all of the plurality of row units 102 using a lengthened driveshaft 106 that extends all the way across combine head 52 and is coupled to all of the plurality of row units 102.

Each driveshaft 106 and driveshaft 116 is rotatably mounted in position relative to end wall 108 of combine head 52 by a respective drive assembly 122-1 and 122-2 that may be at least partially preassembled prior to attachment to end wall 108 of combine head 52.

Figure 6:
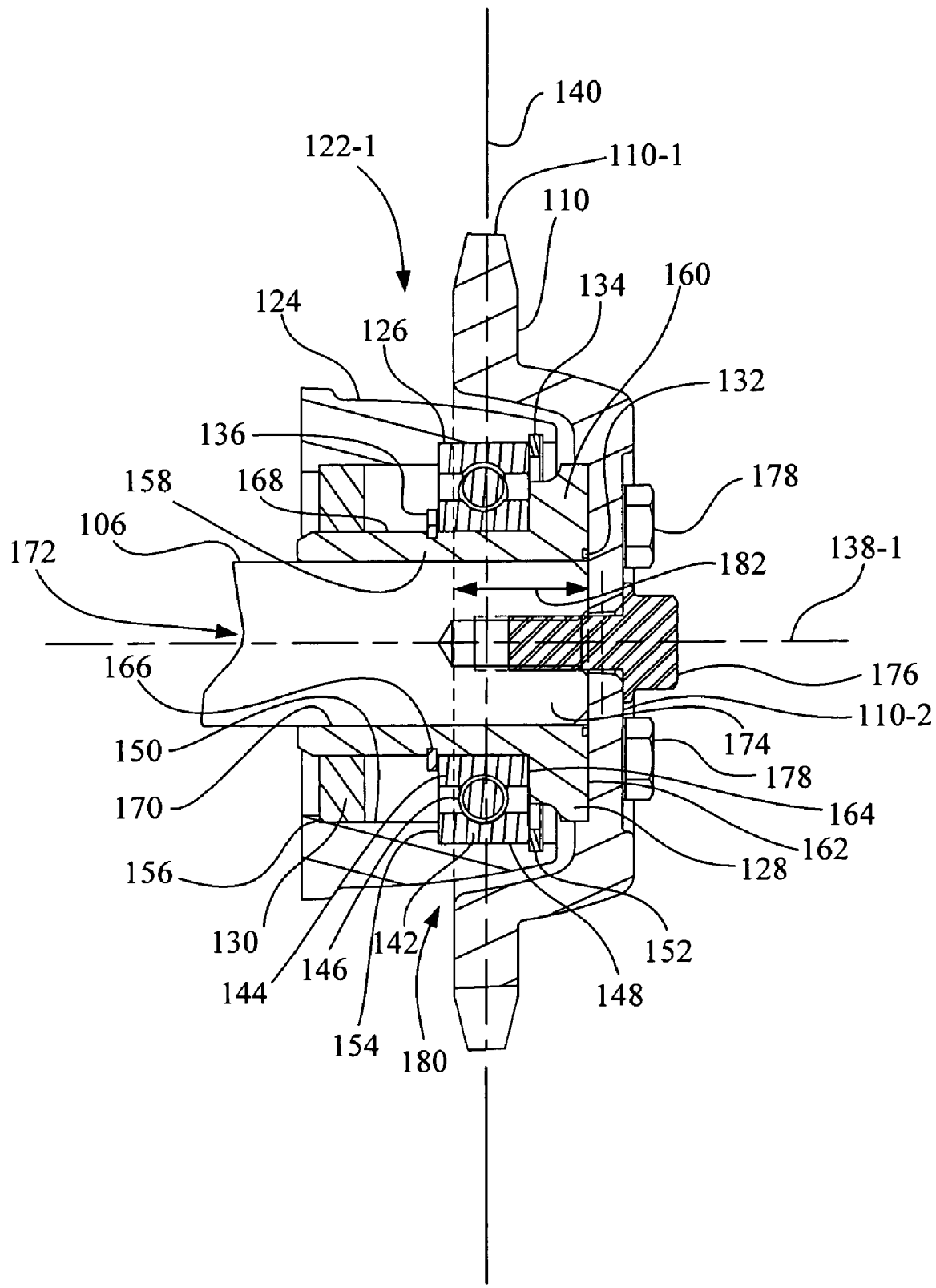
FIG. 6 is an assembled section view of the drive assembly of FIG. 5 taken along plane 6-6-6-6 of FIG. 5

Referring to FIGS. 5 and 6, each drive assembly 122-1, 122-2 includes, for example, a bearing housing 124, a bearing 126, a hub 128, a seal 130, an O-ring 132, an outer snap ring 134, and an inner snap ring 136, as well as a respective sprocket 110 or 114. The drive assembly 122-1 will be described in more detail below, but it is to be understood that drive assembly 122-1 may be representative of the configuration of drive assembly 122-2 as well. For example, in the embodiment of FIG. 5, drive assembly 122-1 and drive assembly 122-2 may be identical, or may be scaled differently (e.g., different sizes of bearings, hubs, etc., depending on the application. However, in the embodiment of FIG. 5, the structural configuration of drive assembly 122-1 and drive assembly 122-2 is the same.

With respect to drive assembly 122-1, when assembled, bearing 126 defines a rotational axis 138-1 of hub 128 and sprocket 110, which in turn is the rotational axis of driveshaft 106. In other words, bearing 126 is coaxial with hub 128 along axis 138-1. Teeth 110-1 of sprocket 110 are aligned along a plane 140 passing radially through bearing 126 relative to axis 138-1, i.e., perpendicular to axis 138-1. In other words, plane 140 is perpendicular to axis 138-1 and passes radially through both bearing 126 and all of the plurality of teeth 110-1 of sprocket 110. Likewise, with respect to drive assembly 122-2, when assembled, bearing 126 defines a rotational axis 138-2 of hub 128 and sprocket 114, which in turn is the rotational axis of driveshaft 116.

Bearing 126 may be, for example, a sealed bearing having an outer race 142 and an inner race 144, and a plurality of ball bearings 146 located between outer race 142 and inner race 144.

Bearing housing 124 includes a first bore 148, a second bore 150, and a snap ring groove 152. A diameter of first bore 148 is selected to accommodate the outer race 142 of bearing 126 in a snug press fit to mount bearing 126 to bearing housing 124. A diameter of second bore 150 is selected to accommodate seal 130 in a snug press fit. First bore 148 defines a bearing seat 154 at the end of the axial extent of first bore 148 along axis 138-1. Snap ring groove 152 is formed in first bore 148 to be axially separated from bearing seat 154 by a distance corresponding to a thickness of outer race 142 of bearing 126 (i.e., in the direction of axis 138-1). Second bore 150 defines a seal seat 156 at the end of second bore 150 along axis 138-1.

Hub 128 includes a stub portion 158 and a shoulder 160 extending radially outward from stub portion 158. Shoulder 160 has an outer surface 162 for mating to a sprocket, e.g., sprocket 110 in this example, and an inner surface defining a bearing seat 164. A snap ring groove 166 is formed in an outer surface 168 of stub portion 158 to be axially separated from bearing seat 164 by a distance corresponding to a thickness of the inner race 144 of bearing 126 (i.e., in the direction of axis 138-1).

An axial opening 170 is formed in and extends through hub 128 at a central region 172 of stub portion 158 along axis 138-1. The shape of axial opening 170 in a direction parallel to plane 140, i.e., perpendicular to axis 138-1, corresponds to the shape of the outer surface of the shaft, e.g., driveshaft 106 or 116, to be inserted into axial opening 170. The shape may be, for example, polygonal (e.g., hexagonal) to ensure that hub 128 and the inserted shaft rotate together coaxially about axis 138-1.

In assembling drive assembly 122-1 or 122-2, seal 130 is inserted in a press (snug) fit into second bore 150 of bearing housing 124. Stub portion 158 of hub 128 is inserted in a snug fit into the inner race 144 of bearing 126 until inner race 144 engages bearing seat 164, and inner snap ring 136 is installed in snap ring groove 166 on stub portion 158 of hub 128. Outer race 142 of bearing 126 is pressed into first bore 148 of bearing housing 124 until outer race 142 engages bearing seat 154, and outer snap ring 134 is installed in snap ring groove 152. Outer snap ring 134 is installed at the outer side of bearing 126 to prevent axial movement of bearing 126 relative to bearing housing 124 along respective axis 138-1 (or axis 138-2). Inner snap ring 136 is installed at the inner side of bearing 126 to prevent axial movement of hub 128 relative to bearing 126 along the respective axis 138-1 (or axis 138-2).

The example that follows describes the mounting of the preassembled drive assembly 122-1 with specific reference to driveshaft 106. However, it is to be understood that the principles of assembly and operation relative to drive assembly 122-1 and driveshaft 106 may be applied to drive assembly 122-2 and driveshaft 116, as well as any other similar configured drive assembly/driveshaft arrangement.

Referring to FIG. 5, an end portion 174 of driveshaft 106 is inserted into axial opening 170 of hub 128 of drive assembly 122-1. Drive assembly 122-1 is then mounted to end wall 108, e.g., by one or more carriage bolts (not shown) passing through a respective opening in end wall 108 and through a corresponding opening in bearing housing 124, and threaded with a corresponding nut. At this time, end portion 174 of driveshaft 106 will be substantially flush with outer surface 162 of hub 128. Also, driveshaft 106 is now rotatably supported by bearing 126 at rotational axis 138-1, which in turn becomes the rotational axis of driveshaft 106. O-ring 132 is installed in an O-ring groove formed in the outer surface 162 around axial opening 170. Sprocket 110 is coupled to end portion 174 of driveshaft 106 by an axially extending fastener, e.g., bolt 176, and sprocket 110 is coupled to shoulder 160 of hub 128 by a fastener, e.g., a ring of bolts 178. Another drive assembly 122-2 is similarly installed with respect to driveshaft 116 and sprocket 114, if not already installed. Chain 112 is installed over teeth 110-1 of sprocket 110 and teeth 114-1 of sprocket 114 to drivably couple drive assembly 122-1 to drive assembly 122-2, and the tension of chain 112 is adjusted by idler sprocket assembly 118. Cover/chain guard 120 may then be installed over chain 112, and attached by fasteners, e.g., screws or bolts, to end wall 108.

As best shown in FIGS. 5 and 6, each of sprockets 110, 114 has a dished, i.e., domed, shape that defines an interior recess 180 having a depth 182. Interior recess 180 may, for example, have a substantially concave shape. In other words, sprocket 110 has a dished shape to axially offset the plurality of teeth 110-1 from an axial outer portion 110-2 of sprocket 110. Likewise, sprocket 114 has a dished shape to axially offset the plurality of teeth 114-1 from an axial outer portion 114-2 of sprocket 114 along axis 138-1. As such, as illustrated in FIG. 6, at least a portion of bearing 126, for example a substantial portion in the present embodiment, is located within interior recess 180 of the respective sprocket, e.g., sprocket 110.

As best shown in FIG. 6, for sprocket 110, depth 182 is selected such that plane 140 radially passes both through all the perimetrical teeth 110-1 of sprocket 110 and through the axial center of bearing 126 (i.e., along axis 138-1) that supports sprocket 110 for rotation. Likewise, for sprocket 114, depth 182 is selected such that plane 140 passes radially through both all the perimetrical teeth 114-1 of sprocket 114 and through the axial center of bearing 126 (i.e., along axis 138-2) that supports sprocket 114 for rotation.

Figure 1:
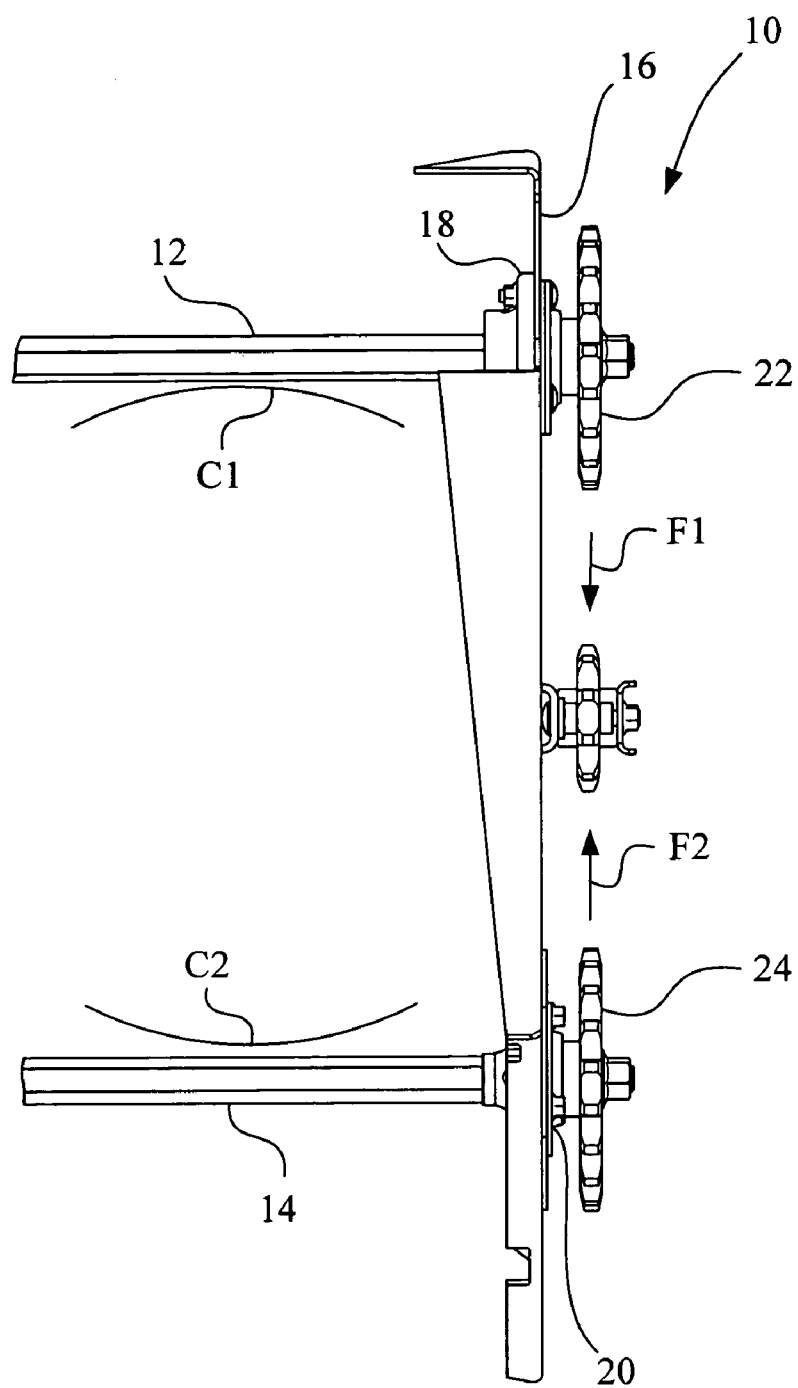
FIG. 1 is a top view of prior art driveshafts illustrating the tendency of the shafts to flex under high loads.

The load on each sprocket 110, 114 is resisted by an opposing force applied by the respective bearing 126 in the same plane 140 perpendicular to the axis of rotation of the respective driveshaft 106, 116 (i.e., axis 138-1, 138-2, respectively). In comparison to the prior art configuration of FIG. 1, the configuration of sprocket 110 and its drive assembly 122-1 reduces the moment applied to the shaft 106 by sprocket 110 at the respective bearing 126 by applying loads to driveshaft 106 directly in the plane 140 of bearing 126, i.e., at different locations along driveshaft 106 than that of the configuration of FIG. 1. Similarly, the configuration of sprocket 114 and its drive assembly 122-2 reduces the moment applied to driveshaft 116 by sprocket 114 at the respective bearing 126 by applying loads to driveshaft 116 directly in the plane 140 of bearing 126, i.e., at different locations along driveshaft 116 than that of the configuration of FIG. 1. This reduces the bending moment on the respective driveshaft, which in turn reduces the resultant misalignment of the sprockets 110, 114 under heavy loads and the concomitant flexure and undue wear of chain 112.

Having described the preferred embodiment, it will become apparent that various modifications can be made without departing from the scope of the invention as defined in the accompanying claims.

The invention claimed is:

1. A combine head, comprising:
   a frame;
   an end wall coupled to said frame;
   a plurality of row units coupled to said frame;
   a first driveshaft drivably coupled to said plurality of row units; and
   a drive system including a first drive assembly, wherein:
   said first drive assembly is coupled to said end wall and coupled to said first driveshaft, said first drive assembly including:
   a first bearing and a first sprocket carrying a torque input, said first bearing rotatably supporting said first driveshaft, said first bearing defining a first rotational axis of said first driveshaft, and having a first plane passing radially through said first bearing perpendicular to said first rotational axis, said first sprocket being drivably coupled to said first driveshaft, said first sprocket having a first plurality of teeth located around a perimeter of said first sprocket, wherein said first plurality of teeth are located so that said first plane passes radially through said first plurality of teeth further comprising a second driveshaft, and wherein:
   said drive system further includes a second drive assembly and a chain, said second drive assembly being coupled to said end wall and coupled to said second driveshaft, said second drive assembly including:
   a second bearing and a second sprocket carrying a torque output, said second bearing rotatably supporting said second driveshaft, said second bearing defining a second rotational axis of said second driveshaft, and having a second plane passing radially through said second bearing perpendicular to said second axis, said second sprocket being drivably coupled to said second driveshaft, said second sprocket having a second plurality of teeth located around a perimeter of said second sprocket, said second plurality of teeth being located so that said second plane passes radially through said second plurality of teeth,
   said chain engaging said first plurality of teeth of said first sprocket and said second plurality of teeth of said second sprocket.

2. The combine head of claim 1, wherein:
   said first sprocket has a dished shape to axially offset said first plurality of teeth from an axial outer portion of said first sprocket; and
   said second sprocket has a dished shape to axially offset said second plurality of teeth from an axial outer portion of said second sprocket.

3. The combine head of claim 2, wherein:
   said dished shape of said first sprocket defines a first interior recess, and wherein at least a portion of said first bearing is located within said first interior recess; and
   said dished shape of said second sprocket defines a second interior recess, and wherein at least a portion of said second bearing is located within said second interior recess.

4. The combine head of claim 1, wherein said second bearing is substantially the sole support for said shaft adjacent said bearing.

5. The combine head of claim 4, wherein said bearing is a ball bearing.

6. A method for driving a combine head, comprising:
   positioning a bearing along a rotational axis;
   positioning a torque carrying sprocket having a plurality of perimetrical teeth relative to said bearing along said rotational axis such that said bearing and said sprocket are coaxial, and such that a plane passes radially through both said bearing and said plurality of teeth of said sprocket relative to said rotational axis;
   mounting said bearing to a bearing housing; and mounting said bearing housing to said combine head; and
   rotatably supporting a shaft of said combine head with said bearing; and drivably coupling said sprocket to said shaft;
   wherein said bearing provides substantially the sole support for said shaft adjacent said bearing.

* * * * *